(12) United States Patent
Bianco (10) Patent No.: US 8,616,447 B2
(45) Date of Patent: Dec. 31, 2013

(54) KIOSK

(75) Inventor: James S. Bianco, Suffield, CT (US)

(73) Assignee: Control Module, Inc., Enfield, CT (US)

( * ) Notice: Subject to any disclaimer, the term of this patent is extended or adjusted under 35 U.S.C. 154(b) by 0 days.

(21) Appl. No.: 13/167,038

(22) Filed: Jun. 23, 2011

(65) Prior Publication Data

US 2011/0316400 A1  Dec. 29, 2011

Related U.S. Application Data

(60) Provisional application No. 61/357,638, filed on Jun. 23, 2010.

(51) Int. Cl.
*G06F 7/08* (2006.01)

(52) U.S. Cl.
USPC .......................................... 235/381; 235/383

(58) Field of Classification Search
USPC .................................. 235/381, 380, 383, 379
See application file for complete search history.

(56) References Cited

U.S. PATENT DOCUMENTS

| | | | | |
|---|---|---|---|---|
| 6,003,015 A | * | 12/1999 | Kang et al. | 705/15 |
| 6,726,101 B1 | * | 4/2004 | McIntyre et al. | 235/382 |
| 6,955,293 B1 | * | 10/2005 | Katsanevas | 235/379 |
| 7,264,159 B2 | * | 9/2007 | Nieuwborg et al. | 235/383 |
| 8,116,081 B2 | * | 2/2012 | Crick, Jr. | 361/724 |

* cited by examiner

*Primary Examiner* — Daniel St. Cyr
(74) *Attorney, Agent, or Firm* — Alix, Yale & Ristas, LLP (57) ABSTRACT

A kiosk has a transaction terminal which is suspended between a pair of uprights. A cover is rotatably positionable between a closed position and an opened position to allow access to said terminal. The cover has a transparent, arcuate hood-like shape. The cover is maintainable in a stable opened position and is automatically returnable to the closed position. A solar array and/or communication equipment may be located above the transaction terminal.

20 Claims, 7 Drawing Sheets

KIOSK

CROSS-REFERENCE TO RELATED APPLICATION

This application claims the priority of U.S. Provisional Patent Application No. 61/357,638 filed on Jun. 23, 2010, the disclosure of which is incorporated by reference in its entirety.

BACKGROUND

This disclosure relates generally to kiosks and publicly accessible facilities for automated financial transactions. More particularly, this disclosure relates to kiosks which are employed to automatically process transactions.

SUMMARY

Briefly stated, a kiosk in one embodiment comprises a base and a pair of uprights projecting upwardly from the base. A transaction terminal is suspended between the uprights. The transaction terminal comprises a card reader and/or an electronic input device which is accessible at a first side. A cover is rotatably positionable to cover the first side in a first closed pivotal position and allow free access to the first side in the second open pivotal position. A latch is configurable to maintain the cover at the second position and is also releasable to allow the cover to rotate to the first position. A return device facilitates return of the cover from the opened to the closed position.

The latch is preferably solenoid operated. A Hall sensor senses the position of the cover and generates a corresponding power control signal. The return device is preferably a weight motor or a spring motor. The cover preferably has a transparent, arcuate hood-like shape. The return device automatically returns the cover from the open to the closed position.

In one embodiment, a solar power unit is mounted at an upper portion of the uprights. An array of solar panels is rotatably positionable relative to the uprights. The kiosk may comprise an upright support assembly, wherein a transaction terminal is mounted to the support assembly and comprises at least one electronic device selected from the group consisting of a card reader, a keyboard, a computer touch screen and a printer. Each of the electronic devices is user-interfaceable at a first side. A cover is rotatably positionable to cover the first side in a first closed pivotal position and retractable to allow free access to the first side in a second open pivotal position. A solenoid operated latch maintains the cover at the second position. The latch is releasable to allow the cover to rotate to the first position wherein it is automatically returned by either a weight motor or a spring motor.

A Hall sensor senses the position of the cover and generates a corresponding power control signal for powering down the kiosk under certain circumstances. In one embodiment, the cover comprises a transparent member having a general shape which may be described as a portion of a cylinder. The cover pivots about a central axis through the quasi-cylindrical member.

DETAILED DESCRIPTION

With reference to the drawings wherein like numerals represent like parts throughout the several Figures, a kiosk is generally designated by the numeral 10. The kiosk functions as a transaction facility. For a preferred application, the kiosk 10 functions as a central transaction location for servicing several electric vehicle charging stations. The kiosk 10 may also be adaptable for functioning as a transaction station for a car rental facility or for numerous other applications.

The kiosk 10 has a sleek, efficient appearance, and in some embodiments, functions as a stand-alone station which does not require a remote power supply or a direct communication line.

Figure 1:
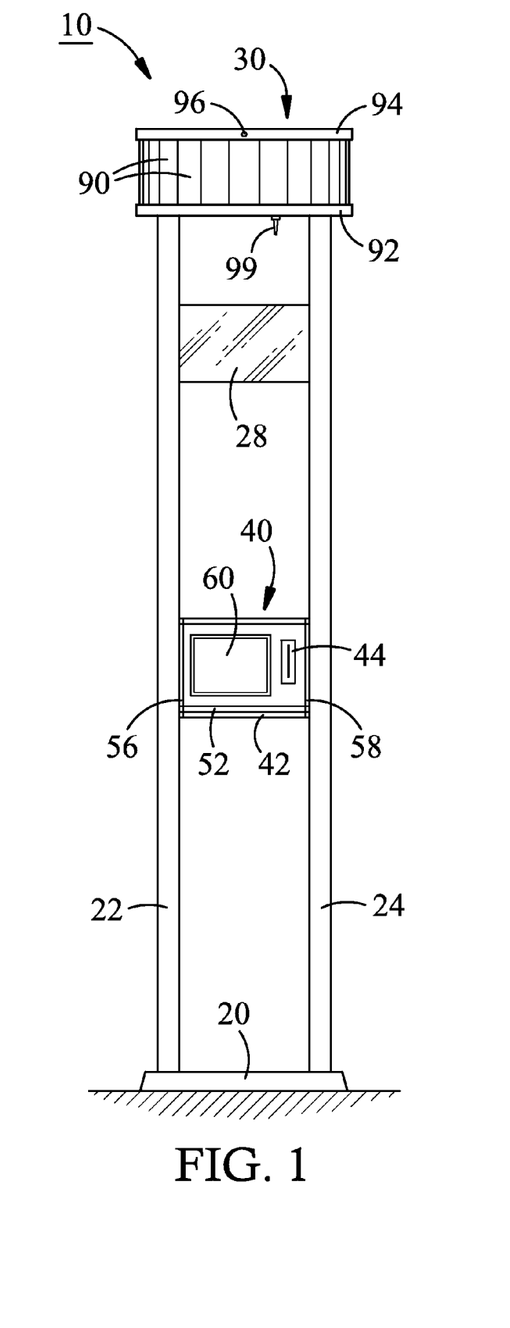
FIG. 1 is a front elevational view of a kiosk.
Figure 2:
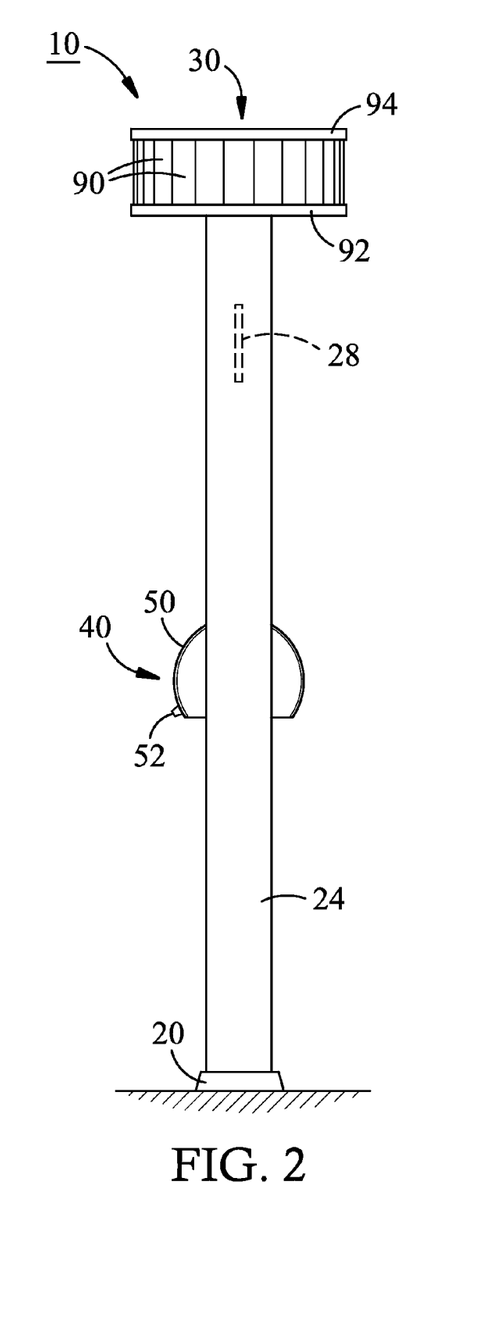
FIG. 2 is a side elevational view of the kiosk of FIG. 1.
Figure 3:
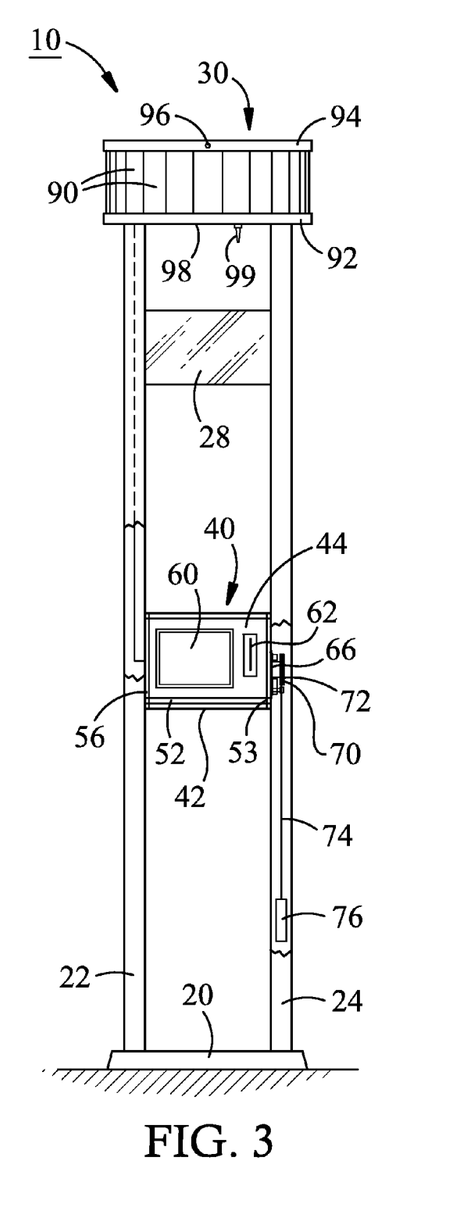
FIG. 3 is an elevational view, portions removed, of the kiosk of FIG. 1.

The kiosk 10 includes a base 20 which is preferably bolted or otherwise fixed to a floor, pavement or other level support. A pair of tubular uprights 22 and 24 extends vertically from the base. In a preferred form, each upright is a 2 inch by 6 inch aluminum tube. The uprights 22 and 24 support at an upward terminus a solar power unit 30. A display panel 28 extends between an upper location of the uprights below the solar power unit 30. The display panel 28 preferably identifies the function or proprietor of the kiosk.

A transaction terminal 40 is suspended between the uprights at an intermediate position so that it is easily accessible to a user. The transaction terminal 40 includes a fixed platform 42 which supports an inclined front panel 44 and an inclined rear panel 46. The panels 44 and 46 converge at an upper apex 48 to form a substantially triangular shaped structure which essentially functions as a tent-like housing and support for various components, as best viewed in FIG. 4. Alternatively, the front and rear panels may be disposed in a parallel or non-intersecting relationship.

Figure 4:
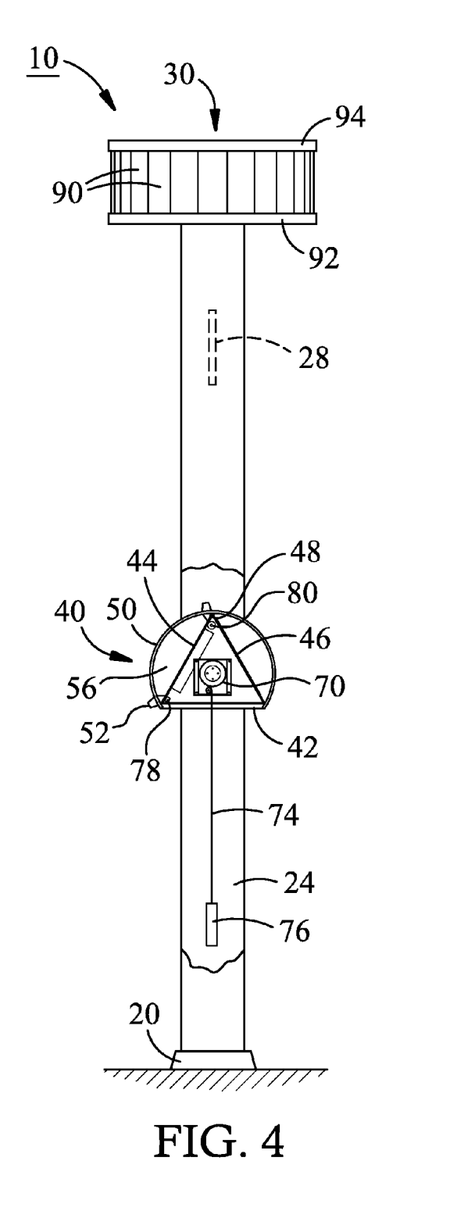
FIG. 4 is a side elevational view, portions removed, of the kiosk of FIG. 1.

A transparent cover 50 having an arcuate hood-like form, or the general shape of a portion of a cylinder, covers the housing. The cover 50 is rotatably pivotable from a closed protective position to an opened operative position which allows user access to the transaction terminal. A lower forward portion of the cover 50 mounts a handle 52 affixed with a magnet 53. The user typically manually grasps the handle 52 and pivots the cover 50 generally upwardly and rearwardly to the opened position. The frontal panel 44 mounts a touch screen computer 60 and a card reader 62. The frontal panel may also mount a keyboard, a printer or other electronic input/output devices.

Figure 9:
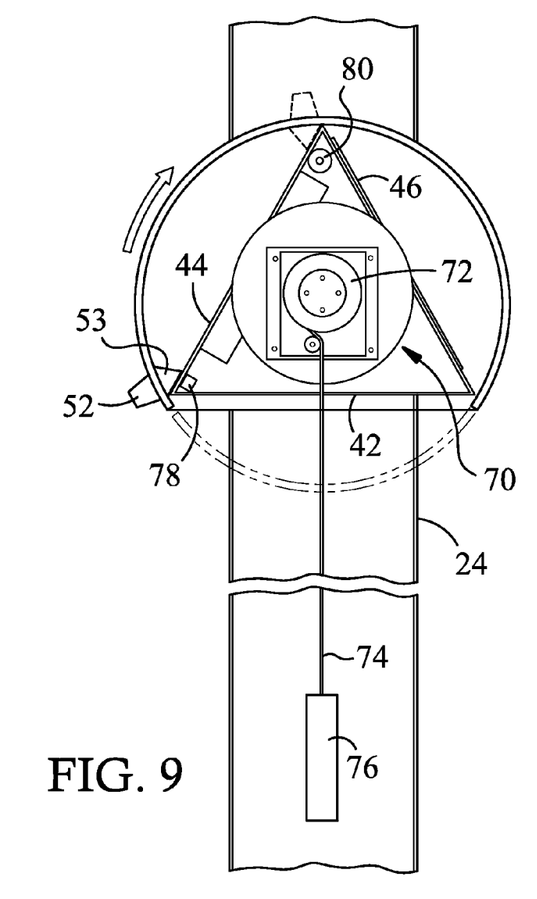
FIG. 9 is an enlarged view, portions removed, partly in phantom and partly in diagram form, of a portion of the kiosk of FIG. 1, viewed from the opposite side thereof to that of FIG. 7, and further illustrating a weight mechanism feature.

The sides 56 and 58 of the cover 50 are bolted to axles journaled into the uprights or rotatably mounted thereto to provide for pivotal motion of the cover 50. One axle 66 rotatably connects with a weight motor 70. The weight motor 70 includes a reel 72 which takes up a cable 74. A weight 76 is suspended from the end of the cable 74.

Figure 10:
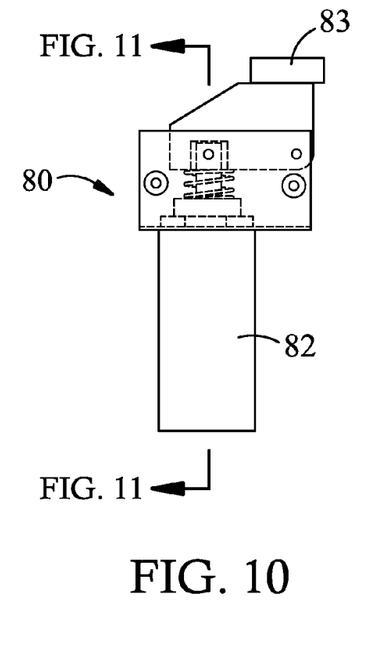
FIG. 10 is an enlarged front view, partly in section, of a latch employed, in the kiosk of FIG. 1.
Figure 11:
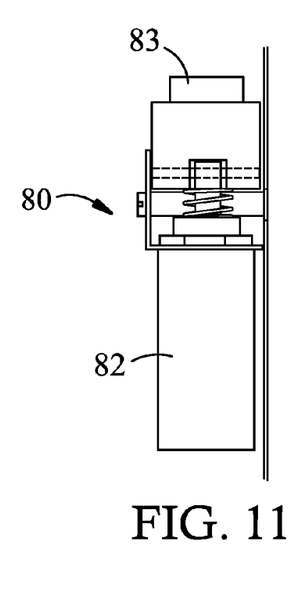
FIG. 11 is an enlarged side view, partly in section, of the latch of FIG. 10.

In one embodiment, the closed position of the cover 50 is sensed by a Hall sensor 78 which effectively senses the proximity of magnet 53. When the cover 50 is moved to the opened position, the handle magnet 53 magnetically engages a magnet 83 of a latch 80 at the upper portion or apex 48 of the housing so that the opened position is a stable position and permits ready access to the front panel of the transaction terminal. The latch 80 is preferably actuated by a solenoid 82.

Figure 7:
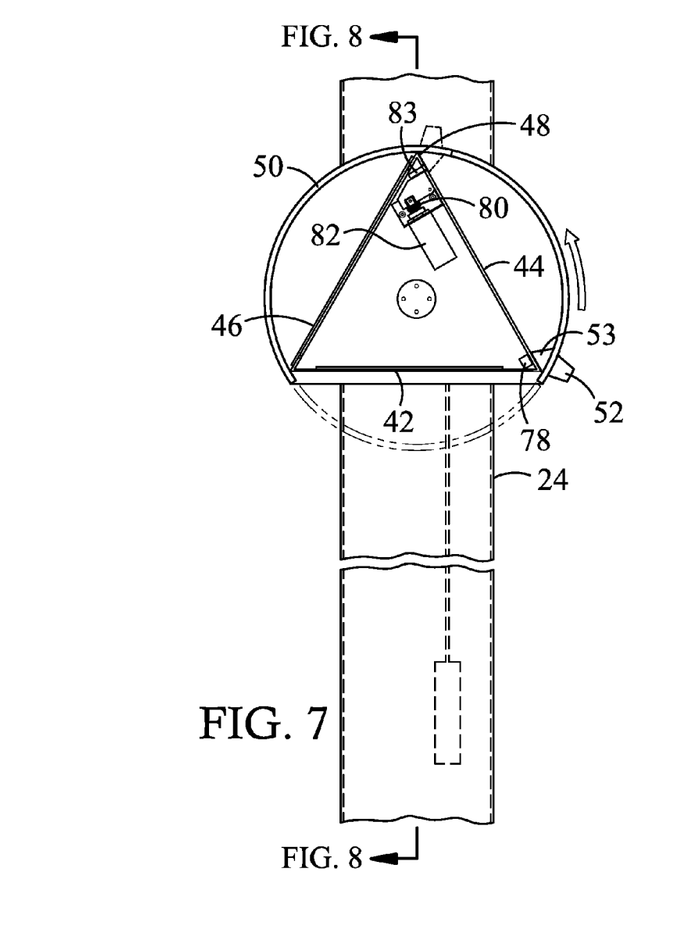
FIG. 7 is an enlarged view, portions removed and partly in diagram form, of a central portion of the kiosk of FIG. 1, viewed from the side thereof.
Figure 8:
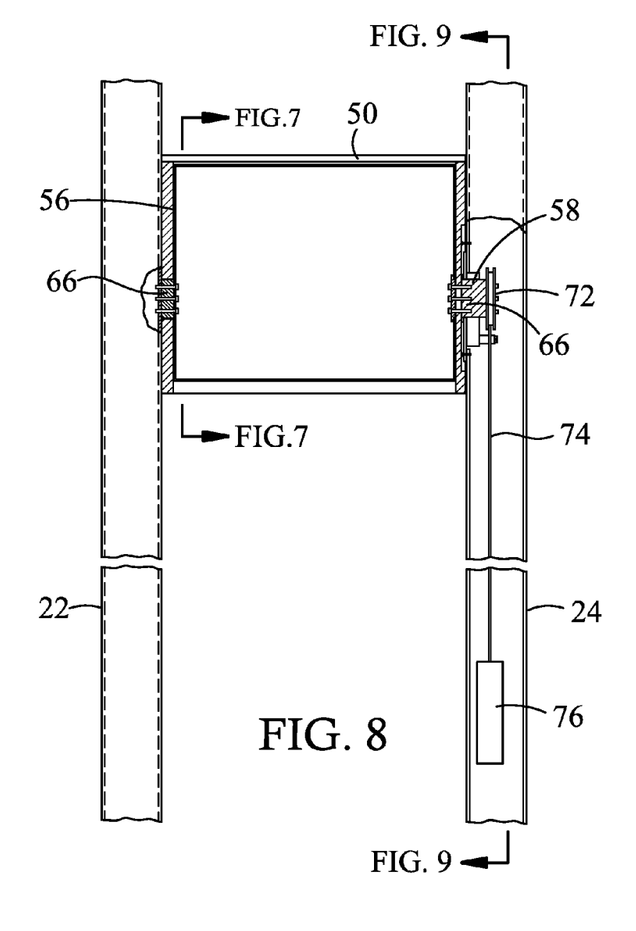
FIG. 8 is an enlarged fragmentary frontal view, portions removed, of the kiosk of FIG. 1.

As the cover is moved to the opened position (arrows of FIGS. 7 and 8), the cable 74 wraps around the reel 72. After the transaction has been completed, a sensing signal is sent to the solenoid 82 which releases the latch 80 and allows the cover to return (rotate) to the closed position under the force of the weight 76. Alternatively, a spring return motor or device may be employed in place of the weight motor or device. The handle includes a magnet 53 which is magnetically attracted to a magnet 83 at the opened position to maintain a stable closed position. The Hall sensor 78 senses the magnetic attraction at the closed position, and accordingly preferably transmits a signal so that the station can be powered down when usage is not required.

In a preferred form, the power for the kiosk is supplied via the solar power unit 30. Solar panels 90 are mounted in a quasi-arcuate array at the interior periphery of a circular support 92. A cap 94 is mounted at the top of the panels 90. Four solar voltaic cells 96 are housed within the cap. The positioning of the solar panels can be easily selectively obtained by simply rotating the solar panel array to obtain the optimal orientation relative to the sun for a given installation site. LED illumination lights 98 may be mounted for illumination at the underside of the support 92. An antenna 99 for data communication is also mounted to the support.

Figure 12:
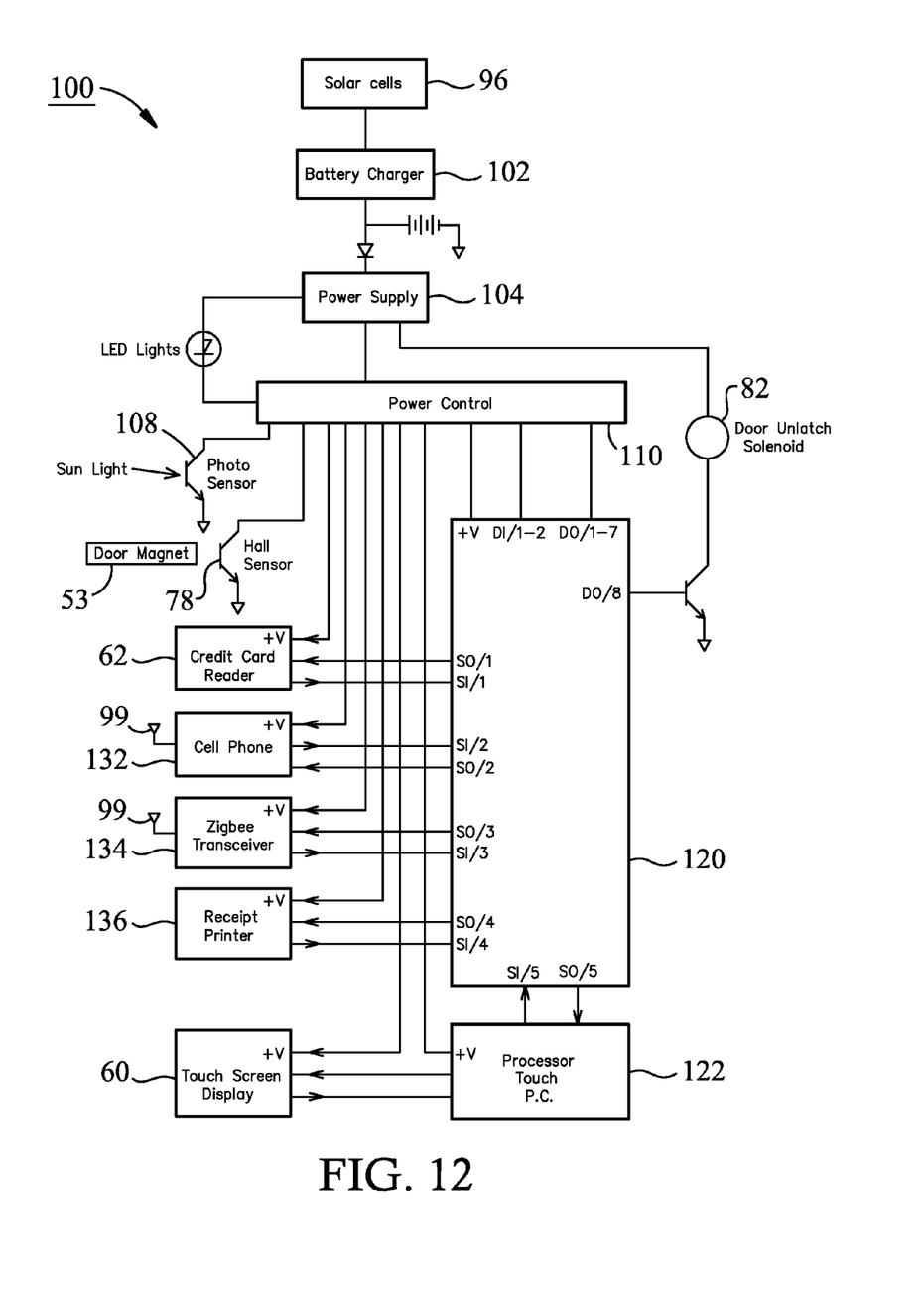
FIG. 12 is a block diagram for the electronic/electrical components of the kiosk of FIG. 1.

A block diagram for the kiosk is generally designated by the numeral 100 in FIG. 12. The solar cells 96 communicate with a battery charger 102 connected for charging a power supply 104. The power supply supplies power to the cover unlatching solenoid 82 as well as to LED lights 98. A photo sensor 108 supplies an input signal for the LED lights 98. The cover magnet 53 is sensed by the Hall sensor 78 which supplies an input to the power control unit 110. An I/O controller 120 communicates with a processor 122 which also, in turn, communicates with the touch screen display 60 at the front of the transaction terminal. The cover unlatching solenoid 82 is also responsive to a signal from the I/O controller. Power is supplied to the credit card reader 62, a cell phone 132, a Zigbee transceiver 134 and a receipt printer 136, each of which also have two-way communication with the I/O controller 120.

The antenna 99 is mounted at an upper location of the kiosk for the cell phone 132 and transceiver 134. The communications to and from the various charging stations are transmitted from and to the Zigbee transceiver 134. The cell phone 132 is employed to communicate the data, such as credit card information, and to receive confirmation. If required, a receipt printer 136, which prints an output receipt, may also be employed.

Figure 5:
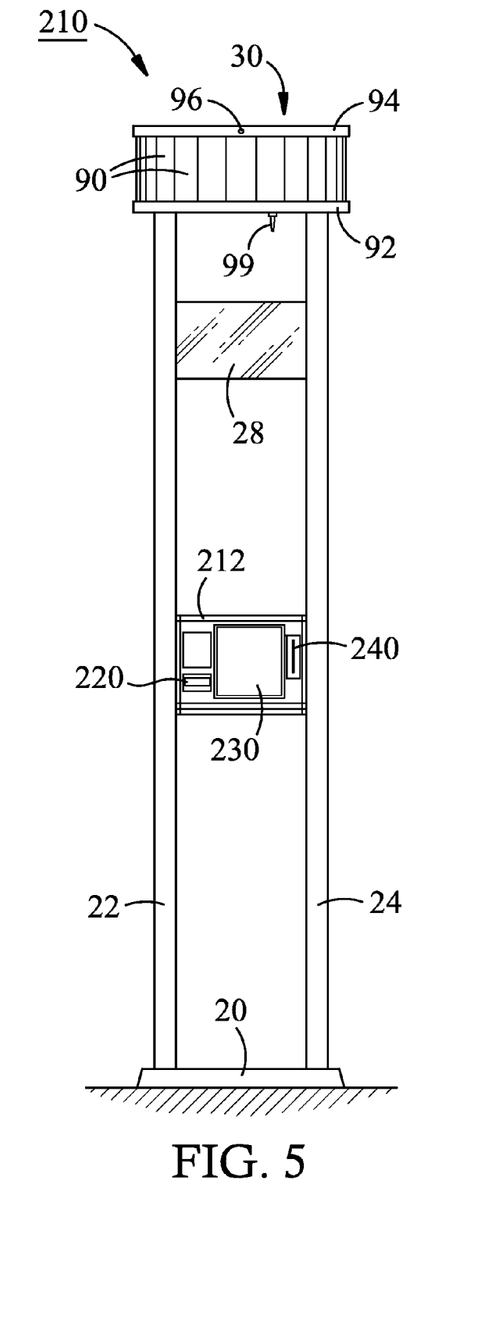
FIG. 5 is a front elevational view of a second embodiment of a kiosk.
Figure 6:
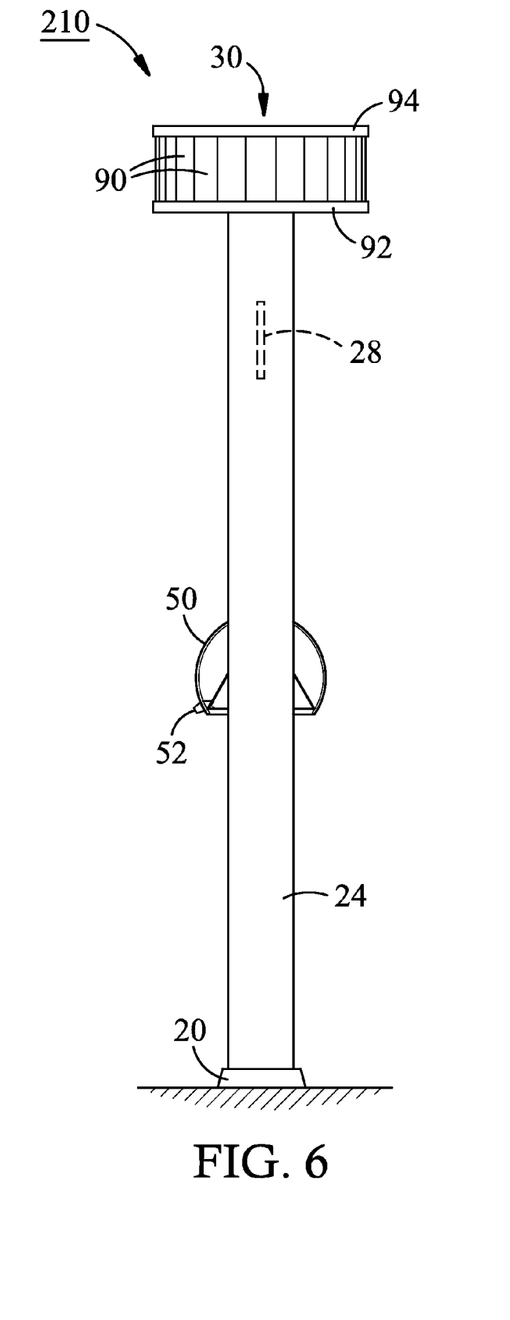
FIG. 6 is a side elevational view of the kiosk of FIG. 5.

For kiosk 210 illustrated in FIGS. 5 and 6, the terminal 212 employs a receipt printer 220 as well as a touch screen computer 230 and a credit card reader 240. This kiosk is especially adapted for use in connection with a vehicle rental facility. The components of the kiosk 210 generally have the same form and function as for kiosk 10.

Figure 13:
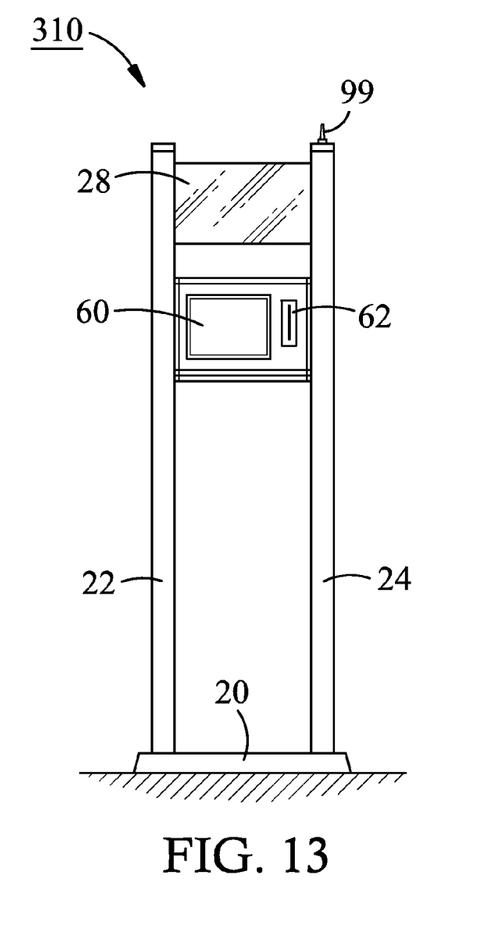
FIG. 13 is a front elevational view of a third embodiment of a kiosk.
Figure 14:
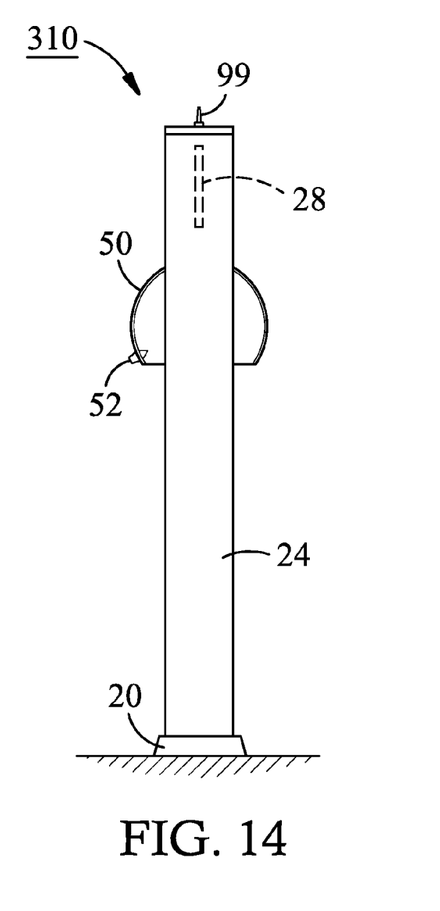
FIG. 14 is a side elevational view of the kiosk of FIG. 13.

With reference to FIGS. 13 and 14, in some embodiments, a solar powered unit is not employed. Power for the kiosk 310 is supplied via a power line which extends through one of the uprights to the terminal 312. The other functions and operations of the kiosk 310 are substantially similar to that previously described for kiosk 10.

The invention claimed is:

1. A kiosk comprising:
 a base;
 a pair of uprights projecting upwardly from said base;
 a transaction terminal suspended between said uprights at an elevated location above said base and comprising a card reader and an electronic input device;
 a rotatable cover having an axis of rotatation and rotatably positionable about said axis of rotatation along an arcuate path between a closed position and an angularly spaced opened position, in said closed portion said cover preventing access to said transaction terminal and in said opened position allowing free access to said transaction terminal;
 a latch configurable to maintain said cover at said second opened position and releasable to allow said cover to rotate to said closed position; and
 a device which facilitates return of said cover from said opened to said closed position.

2. The kiosk of claim 1 wherein said latch is solenoid operated.

3. The kiosk of claim 1 further comprising a solar power unit mounted at an upper position of said uprights.

4. The kiosk of claim 3 further comprising an array of solar panels which are rotatably positionable relative to said uprights.

5. The kiosk of claim 4 further comprising a Hall sensor for sensing the position of said cover and generating a corresponding power control signal.

6. The kiosk of claim 1 wherein the device is a weight motor or a spring motor.

7. The kiosk of claim 1 wherein said cover has an arcuate hood-like shape.

8. The kiosk of claim 1 wherein said cover is transparent.

9. A kiosk comprising:
 a base;
 a pair of uprights projecting upwardly from said base;
 a transaction terminal suspended from said uprights at an elevated position above said base and accessible at a frontal portion;
 a rotatable cover having an axis of rotatation and rotatably positionable about said axis of rotatation along an arcuate path between a closed position and an angularly spaced opened position, in said closed position said cover prevents access to said frontal portion and in said opened position allows free access to said frontal portion;
 a mechanism which maintains said cover at said opened position and is releasable to allow said cover to rotate to said closed position; and
 a device which automatically returns said cover from said opened to said closed position.

10. The kiosk of claim 9 wherein said mechanism is a solenoid operated latch.

11. The kiosk of claim 9 further comprising a solar power unit mounted at an upper position of said uprights.

12. The kiosk of claim 11 further comprising an array of solar panels which are rotatably positionable relative to said uprights.

13. The kiosk of claim 9 further comprising a Hall sensor for sensing the position of said cover and generating a corresponding power control signal.

14. The kiosk of claim 9 wherein the device is a weight motor or a spring motor.

15. A kiosk comprising:
- an upright support assembly;
- a transaction terminal mounted to said support assembly at an elevated position and comprising at least one electronic device selected from the group consisting of a card reader, a keyboard, a computer touch screen and a printer, each said electronic device being user interfaceable;
- a rotatable cover having an axis of rotatation and rotatably positionable along an arcuate path between an opened position and an angularly spaced closed position, in said closed position, said cover covers said transaction terminal and prevents access to said transaction terminal and in said opened position allows free access to said at least one electronic device of said transaction terminal.

16. The kiosk of claim 15 further comprising a solenoid operated latch to maintain said cover at said opened position.

17. The kiosk of claim 16 wherein said latch is releasable to allow said cover to rotate to said closed position.

18. The kiosk of claim 17 wherein a weight motor or a spring motor automatically returns said cover to said closed position.

19. The kiosk of claim 18 further comprising a Hall sensor for sensing the position of said cover and generating a corresponding power control signal for powering down the kiosk.

20. The kiosk of claim 15 wherein said cover comprises a transparent member having a general shape which is a portion of a cylinder and pivots about a central axis through said cylinder.

\* \* \* \* \*